United States Patent [19]

Horning

[11] Patent Number: 5,420,998
[45] Date of Patent: May 30, 1995

[54] DUAL MEMORY DISK DRIVE

[75] Inventor: Randall F. Horning, Longmont, Colo.

[73] Assignee: Fujitsu Limited, Kanagawa, Japan

[21] Appl. No.: 866,441

[22] Filed: Apr. 10, 1992

[51] Int. Cl.⁶ .............................................. G06F 12/02
[52] U.S. Cl. ............................ 395/425; 364/DIG. 1; 364/238.4; 364/238.6
[58] Field of Search ... 364/200 MS File, 900 MS File; 395/400, 425

[56] References Cited

U.S. PATENT DOCUMENTS

| | | | |
|---|---|---|---|
| 4,476,526 | 10/1984 | Dodd | 395/425 |
| 5,117,350 | 5/1992 | Parrish et al. | 395/425 |
| 5,142,627 | 8/1992 | Elliot et al. | 395/275 |
| 5,218,691 | 6/1993 | Tuma et al. | 395/500 |
| 5,269,011 | 12/1993 | Yanai et al. | 395/425 |
| 5,325,488 | 6/1994 | Carteau et al. | 395/275 |

FOREIGN PATENT DOCUMENTS

| | | |
|---|---|---|
| 0387871 | 9/1990 | European Pat. Off. |
| 0430727A1 | 6/1991 | European Pat. Off. |
| 4029980A1 | 4/1991 | Germany . |
| 62-154018 | 7/1987 | Japan . |
| 62-257553 | 11/1987 | Japan . |

OTHER PUBLICATIONS

S. Powell, "SCD Balances Performance and Capacity," Computer Technology Review—Hard Disk Storage, pp. 32-35, 1991, No. 12, Los Angeles, Calif.

*Primary Examiner*—Joseph L. Dixon
*Assistant Examiner*—Hiep T. Nguyen
*Attorney, Agent, or Firm*—Sheridan Ross & McIntosh

[57] ABSTRACT

A dual disk drive peripheral data storage system is disclosed. The dual disk drive is a combination of a hard disk drive and a solid state disk drive whereby the solid state buffer memory that is typically used as a data cache for the hard disk drive is partitioned such that one portion provides the memory for the solid state disk drive while another portion remains as the cache for the hard disk. The dual disk drive provides the capability for a user to repartition the solid state buffer memory such that the sizes of the solid state disk drive memory and cache memory can be adjusted to increase the data transfer rate with a host computational system.

36 Claims, 11 Drawing Sheets

DUAL MEMORY DISK DRIVE

FIELD OF THE INVENTION

The present invention relates to disk drives and, in particular, to partitioned solid state memory used in a disk drive storage system.

BACKGROUND OF THE INVENTION

As the speed of host computational systems increase, one of the primary system bottlenecks becomes the inefficiency in retrieving data from peripheral storage subsystems. Such subsystems have been typically based on magnetic or hard disk technology. The mechanical components of this technology (e.g. the disk rotation and read/write head movement components), cause these subsystems to be inherently slow in comparison to the electronic speeds of the host computational systems they are designed to support. Various strategies have been devised to increase the data transfer rate of hard disk technology. One such strategy combines a relatively small volatile solid state data cache together with a hard disk such that data items that are most frequently accessed are maintained in the cache. Since such a cache has a substantially higher data transfer rate than a hard disk, a significant increase in host data processing efficiency can be obtained. In fact, the larger this cache the better performance can be expected from the host system when processing data transfer intensive applications. There are however disadvantages to this strategy. In particular, since most of the information for anticipating future data requirements of host applications reside in the host, for most efficient cache use, the host must make decisions as to what data should be retained in the cache. This implies that the host must be capable of managing such characteristics as the size of data items in the cache, when data items are to be placed in the cache and when they are to be replaced by other items more likely to be accessed. However, since there are no cache/host interface standards, any host/hard disk cache interface strategy will be restricted to a narrow range of host systems. The disk controller, therefore, is left with the responsibility of managing the data transfer between the cache, the hard disk and the host. In such cases the controller usually supplies a relatively simple, and less than optimal, data caching strategy such as the strategy where the most recently accessed data is always stored in the cache regardless of the access frequency. This drawback can, of course, be overcome to some extent by increasing the cache size, but cache memory under utilization is an expensive disadvantage.

More recently, an alternative strategy to alleviate the hard disk data transfer bottleneck has been devised. Solid state memory devices, known as "solid state disks" (SSDs), have been introduced that interface to host systems using the same interface standards as have been applied to hard disks, for example, the Small Computer Systems Interface (SCSI) standard. Thus, a host can configure SSD storage, set performance parameters and transfer data as if an SSD were a standard conforming hard disk. Thus, each SSD provides data transfer rates comparable to those of a host system plus the capability to communicate properly with most host systems without host or SSD modifications. There are however drawbacks to SSD technology also. The memory within substantially all SSDs is relatively small and possibly volatile. Thus, by necessity a host system using an SSD also uses a larger non-volatile peripheral storage as well, typically hard disks. However, having a peripheral storage composed of both hard disks and SSD devices leads to increased hardware expense (e.g. separate power units and cabling), increased demands on space to accommodate the storage devices and increased maintenance costs. This is particularly unfortunate in that much of the hardware and associated software for both hard disks and SSDs are similar internally as well as having identical host interfaces.

It would be beneficial to be able to combine a hard disk and SSD into a single unit thus reducing the duplication in hardware and software, and thereby reducing the peripheral storage costs. It is well known in the art how to configure a single hard disk controller to manage the data transfer between a host system and a plurality of hard disks, thus reducing hardware and software duplication. However, combining an SSD and a hard disk requires a different approach. Since an SSD is already capable of transferring data at electronic rates, any disk controller data caching is both unnecessary and wasteful for data items stored on the SSD. Moreover, an SSD does not require the controller to provide as elaborate an internal data formatting structure as a hard disk requires. For example, no "pad bytes" are necessary to account for a rotational displacement resulting from the time taken by hard disk logic computations in verifying a correct disk sector for a read or write. In fact, due to the significantly higher cost per byte of storage for an SSD in comparison to a hard disk, it is mandatory that this superfluous structure be omitted. Finally, if volatile memory is used in an SSD, preventing the loss of data during power failures must be addressed somewhat differently than in the multiple hard disk configuration.

SUMMARY OF THE INVENTION

The present invention relates to a method and apparatus for storing data such that the storage system produces efficient data transfers with a host computational system. The storage system is a dual disk drive system that includes a non-volatile hard disk storage device that has relatively slow data transfer rates in comparison to the host system and a solid state disk (SSD) storage device that has much higher data transfer rates. The solid state buffer memory, normally used as a data cache in a conventional hard disk drive, in accordance with the present invention, is partitioned into two portions one portion remains as the hard disk data cache as in the conventional hard disk drive configuration while the other portion is used as memory for an SSD such that the SSD memory is considered by the host to be an entirely separate storage device from that of the hard disk. Thus, since the hard disk and the cache are considered a single data store to the host, data residing in either of these stores cannot reside in the SSD memory without an explicit data transfer command issued by the host system. Conversely, data residing in the SSD memory cannot, in normal operation, be transferred to the hard disk/cache portion of the dual disk drive except by an explicit host system data transfer command.

In a preferred embodiment, to enable the buffer memory to be partitioned into cache and SSD memory, a cache/SSD data transfer hardware unit is provided. This unit provides the hardware by which all data transfers from/to the buffer memory are accomplished such that:

(i) The unit operates as a disk read/write unit when a data transfer is directed to the SSD memory partition. That is, upon a write the unit formats the data into a "disk-like" format (i.e. with sector headers and error correction code bits) and upon a read the unit translates the data back into the form expected by the host.

(ii) The unit allows cache data to pass from/to the cache memory partition without additional data formatting.

Of course software must also be supplied to coordinate the activities of this new cache/SSD data transfer unit with the rest of the dual disk drive. That is, software is provided that can determine from host specified addresses whether a host data transfer applies to the hard disk/cache or to the SSD memory, and subsequently signals the cache/SSD data transfer unit to process any cache or SSD data transfer appropriately.

Additional software is also provided to initialize the dual disk drive and to assure SSD data integrity upon power failure. To make the initialization of the dual disk drive as simple as possible for system administration personnel, the initialization procedure has been constructed so that the dual disk drive can be initialized comparable to a conventional hard disk drive. In this case, the parameters for configuring the dual disk drive are supplied with default values during dual disk drive initialization. These parameters include: (i) parameter(s) indicating the sizes of the cache and SSD memory portions of the buffer memory and (ii) parameters indicating the data organization of the SSD memory into cylinders, tracks and sectors. In addition, once the dual disk drive is initialized, a host system user is supplied with the capability to modify the values of these parameters and thus reconfigure the buffer memory. The reconfiguration is accomplished by providing software that can interpret dual disk drive specific parameters within SCSI configuration commands. With regard to power failure, if the SSD includes volatile memory, then the invention uses one of two well known methods for assuring against SSD data loss. Namely, an auxiliary power source either supplies sufficient power to the buffer memory for retaining SSD data for a lengthy time period beyond the main power supply failure or supplies sufficient power to transfer the data residing in the SSD memory to the hard disk immediately upon sensing a power failure has occurred.

In an alternate embodiment of the dual disk drive, a second data channel to the buffer memory is included. This channel is used for all data transfers from/to the SSD memory portion of the buffer controller. Thus, while the first embodiment requires the dual disk drive itself to determine to which of the hard disk/cache or the SSD memory a host data transfer is directed via address comparisons, the second embodiment is more conventional in that the host determines the data storage device and sends each data transfer to the appropriate data channel.

In summary, by coalescing a hard disk drive and a solid state disk drive into a single unit, this invention provides a large non-volatile data store and a smaller data store with extremely fast data transfers for data known to be accessed frequently. This is accomplished in a cost effective manner by sharing hardware and software components between the hard disk portion and the solid state disk portion of the invention. In particular, due to the sharing of the solid state buffer memory between the cache and the SSD, the invention can be configured to provide optimal performance for a given host by providing the capability to adjust the buffer memory allocation between the SSD memory and the cache. In addition, the power unit, cabling and disk controller, plus associated software, for the hard disk may be shared by the SSD portion. Still further advantages accrue from the fact that the dual disk drive can be constructed by enhancing a commercially available hard disk drive. Thus, the most cost effective hard disk drives can serve as a basis for the invention. There is even a further cost savings in that memory intended for use as SSD memory is typically priced substantially higher than memory intended for use as hard disk cache. Thus, the cost effectiveness of using disk controller memory as SSD memory can be significant.

Other features and benefits of the present invention will become apparent from the detailed description with the accompanying figures contained hereinafter.

BRIEF DESCRIPTION OF THE DRAWINGS

The present invention will be better understood from the detailed description given below and the accompanying drawings which are given by way of illustration only, and thus are not limitative of the present invention.

DETAILED DESCRIPTION OF THE PREFERRED EMBODIMENT

Figure 1:
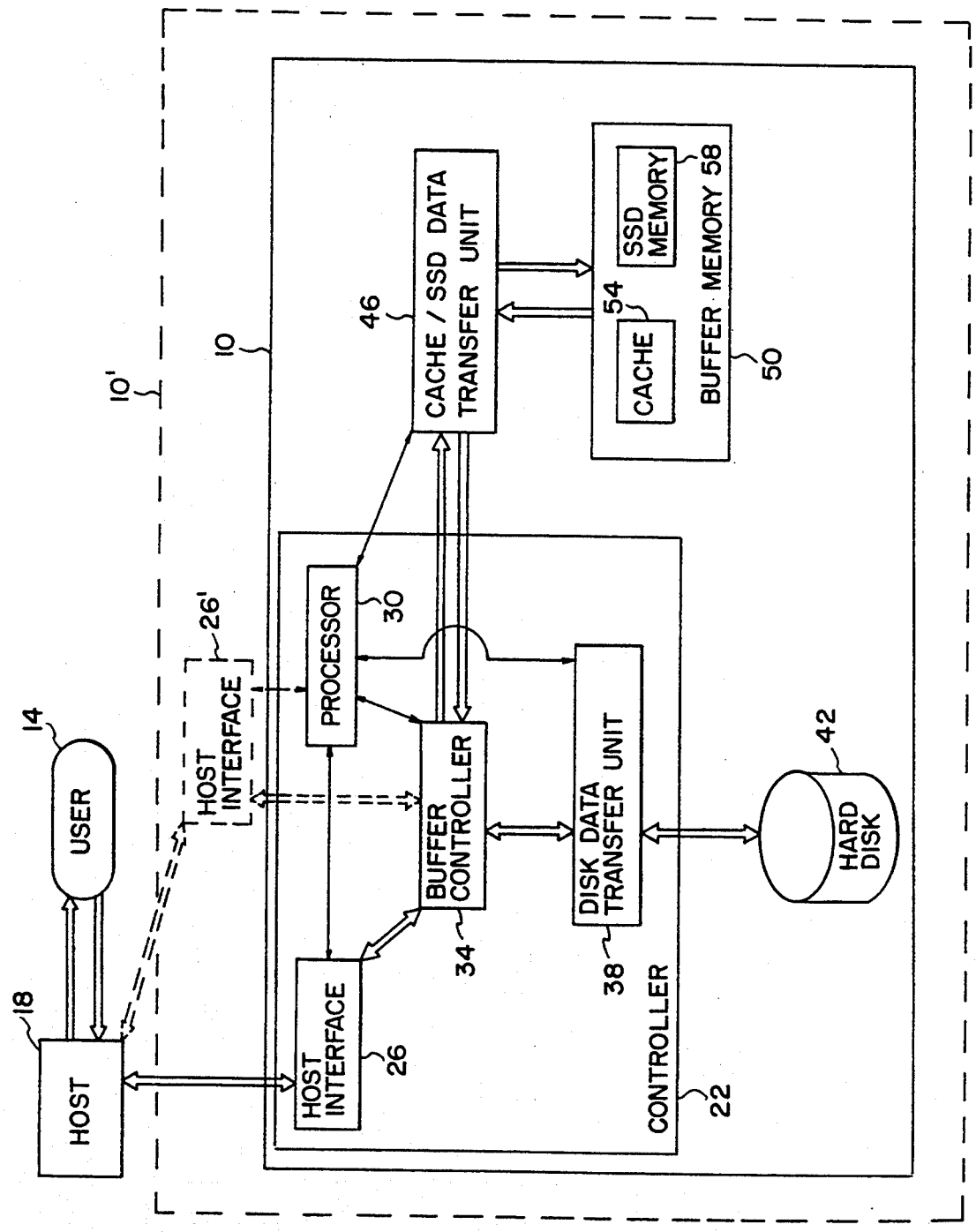
FIG. 1 is a data flow diagram illustrating the two embodiments of the dual disk drive within the context where data interactions with a host computational system and a user are also illustrated.

With reference to FIG. 1, a data flow diagram is presented disclosing two preferred embodiments of the dual disk drive 10 and 10' together with a preferred computational context consisting of a host 18 computational system and a user or system administrator 14. The first embodiment, dual disk drive 10, is represented by the solid lined components and arrows. The second embodiment, dual disk drive 10', is, essentially, all of the first embodiment plus those components and arrows that are dashed. The arrows in FIG. 1 represent data connections or interactions between the components of the dual disk drive 10 (or 10'), the host 18 and the user 14. The double-lined arrows indicate the primary data paths used during dual disk drive 10 (or 10') storage operations. A single double-headed double-lined arrow indicates a single data connection which can be used to transfer data in either direction, but only one direction at a time. Two single-headed double-lined arrows imply that, under some circumstances, data flows can be multiplexed over a single data connection so that conceptually it appears to flow in both directions simultaneously. Each single-lined arrow denotes a data flow not directly associated with the transfer of data from/to the host 18. Such arrows represent data flows that occur during the initialization of dual disk drive 10 (or 10') components or during the transfer of exception data resulting from data processing errors.

During operation of dual disk drive 10, the user 14 requests the execution of tasks on the host 18. To fulfill the tasks, the host 18, in turn, initiates any data transfers necessary with the dual disk drive 10 with which it is electrically connected. The dual disk drive 10 consists of a controller 22, a hard disk 42, a buffer memory 50 and a cache/SSD data transfer unit 46. The controller 22 has electrical data connections to four data sources: the host 18, and three data sources contained in the dual disk drive 10: the hard disk 42, and indirectly, via the cache/SSD data transfer unit 46, the cache memory 54 and the SSD memory 58. Note that both the cache memory 54 and the SSD memory 58 are subdivisions or partitions of the buffer memory 50. The data source connections allow the controller 22 to control the transfer of data between the host 18 and the other three data sources. The hard disk 42 data source provides persistent or nonvolatile data storage together with the necessary data accessing mechanisms and logic for reading and writing data. The buffer memory 50 is preferably solid state memory providing data storage plus data transfer rates much higher than the hard disk 42, in fact, preferably rates greater than the transfer rate of the host 18. Thus, both the cache memory 54 and the SSD memory 58 are intended to supply storage for those data items that are accessed frequently by the host 18. The cache memory 54 stores frequently accessed copies of hard disk 42 data items, preferably without any control bits relating to hard disk 42 data formatting. The SSD memory 58 stores frequently accessed data items in a "disk-like" format. That is, the data format imposed on the SSD memory 58 is similar to the format that is imposed upon the hard disk 42 storage. For example, the SSD memory 58 is segmented into tracks with each track being divided into sectors and each sector having both a header and error correction bits. In addition, if the SSD memory 58 is sufficiently large, the tracks are also collected into cylinders. Thus, the SSD memory 58 can be used as if it were an extraordinarily fast hard disk. As mentioned, the buffer memory 50 has an electrical data connection to the cache/SSD transfer unit 46. In the dual disk drive 10 embodiment, the primary functions of the cache/SSD data transfer unit 46 are: (i) to serve as the sole data transfer interface between the controller 22 and the two data sources within the buffer memory 50, (ii) to translate between the disk-like data format of the SSD memory 58 and the data format required by the host 18 and (iii) to check for data transfer errors from/to the SSD memory 58. Returning to the controller 22, it includes: a host interface 26, a buffer controller 34, a disk data transfer unit 38 and a processor 30. The host interface 26 supplies the electrical data connection to the host 18 for all host communication. The host interface 26 is also connected to both the processor 30 and the buffer controller 34. When a host data transfer command is received by the host interface 26, the connection with the processor 30 allows the host interface 26 to alert the processor 30 so that the processor can interpret and execute the command. In general, the processor 30 controls or monitors all data storage activities in the sense that it contains the functionality for delegating tasks to other dual disk drive 10 components and for determining the status of delegated tasks; e.g. whether or not a delegated task must be retried or an error generated. The connection between the host interface 26 and the buffer controller 34 allows data transfers between the host interface 26 and the three data sources of the dual disk drive 10. The buffer controller 34 provides the common data transfer functionality that allows efficient data transfers among the data sources. In this context, the buffer controller 34 reconciles differences in data transfer rates among the data sources so that faster data sources do not needlessly wait for slower data sources. In addition to the connection with the host interface 26, the buffer controller 34 has a single data connection with each of the cache/SSD data transfer unit 46 and the disk data transfer unit 38. The disk data transfer unit 38 provides functionality with respect to the hard disk 42 that is similar to the functionality provided by the cache/SSD data transfer unit 46 with respect to the SSD memory 58. That is, the disk data transfer unit 38: (i) translates data into/out of the data format required by the hard disk 42 and (ii) checks for data transfer errors from/to the hard disk 42.

To briefly describe the operation of the dual disk drive 10 during normal operation, the host 18 typically requests one or more "data blocks" (i.e. uniformly fixed size blocks of data) to be read from or written to a "logical block address" (i.e. an address derived from an addressing scheme used by the host 18 to address peripheral storage data locations). Assuming the logical block address corresponds to a storage location within the dual disk drive 10, the request is transferred to the host interface 26. The host interface 26 interrupts processor 30 indicating that a data transfer request is pending. The processor 30 interprets the request determining whether it is a read or a write. In addition, the processor 30 determines whether the logical block address associated with the request corresponds to a hard disk 42 location or to an SSD memory 58 location. If the data transfer is directed to a hard disk 42 location, then preferably the transfer must be through the cache memory 54 regardless of whether the host request is a read or write. That is, if a data read is requested then a valid copy of the requested data must either reside in the cache memory 54 or be transferred into the cache memory 54 from the hard disk 42 via the disk data transfer unit 38, the buffer controller 34 and the cache/SSD data transfer unit 46. In any case, the requested data is subsequently transferred from the cache memory 54 to the host 18, via the cache/SSD data transfer unit 46, the buffer controller 34 and the host interface 26. Conversely, if a hard disk 42 data write is requested, then the data is always written from the host interface 26, via the buffer controller 34 and the cache/SSD data transfer unit 46, to the cache memory 54. Subsequently, the data is written to the hard disk 42 via the cache/SSD data transfer unit 46, the buffer controller 34 and the disk data transfer unit 38. Of course there are well known caching strategies that can be employed to facilitate these data transfers. For example, data written from the host 18 to the cache memory 54 can be either written to the hard disk 42 prior to the execution of any further host 18 data transfer requests (known as "write through" caching) or, written to the hard disk 42 as time and circumstances permit (known as "write back" caching). If, on the other hand, the host 18 data transfer is directed to an SSD memory 58 location, then for a write, each data block is transferred from the host interface 26, via the buffer controller 34, to the cache/SSD data transfer unit 46 where it is written to the SSD memory location. Note that prior to receiving a data block, the cache/SSD data transfer unit 46 has checked the sector header to which the write is directed. Thus, data merely flows through the cache/SSD data transfer unit 46 into the data area of the sector leaving only the sector error correction code bits to be appended following the write. For a read from a location in the SSD memory 58, the steps are essentially reversed from those of a write. That is, the cache/SSD data transfer unit 46 does any inspections of the sector header and error correction code bits associated with the requested data block and subsequently the data block residing at the location is transferred by the cache/SSD data transfer unit 46 to the buffer controller 34 where it is, in turn, transferred to the host interface 26 and from there to the host 18.

In the alternative embodiment, dual disk drive 10', data transfers between the host 18 and the SSD memory 58 are done exclusively through the alternate data channel that includes the host interface 26', the processor 30, the buffer controller 34 and the cache/SSD data transfer unit 46. Thus, while the dual disk drive 10 embodiment requires the dual disk drive itself to determine to which of the hard disk/cache or the SSD memory 58 a host data transfer is directed, the alternative embodiment is more conventional in that the host determines the data storage device and sends each data transfer to the appropriate data channel. In this second data channel, the host interface 26' provides the same functionality that the host interface 26 provides for the dual disk drive 10. All other components of the dual disk drive 10 used in the new data channel accomplish the same data transfer tasks regardless of the data channel active. The processor 30, however, will, in addition, be responsible for coordinating data transfer traffic between the components used in common between the two data channels.

Figure 2:
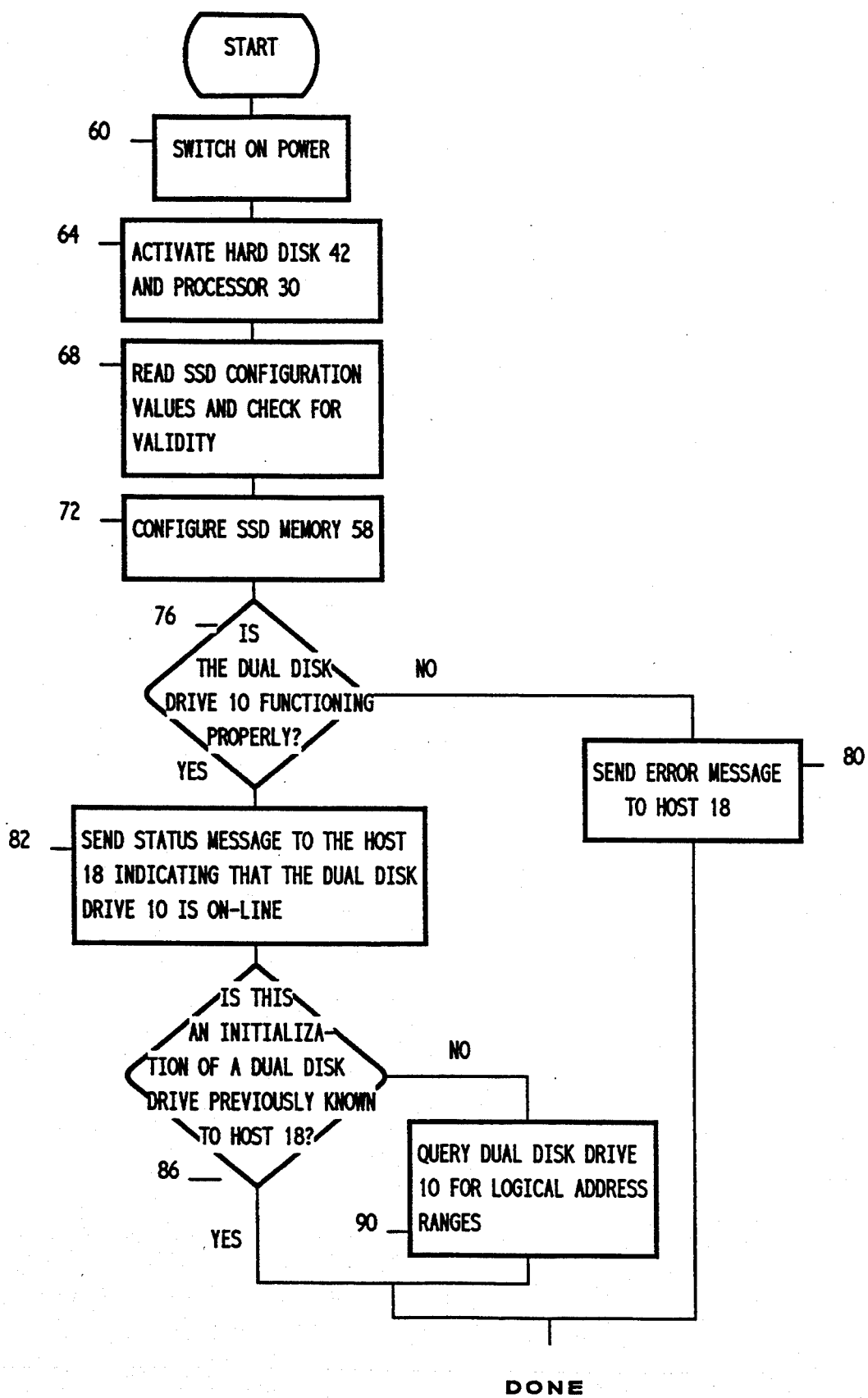
FIG. 2 is a flowchart illustrating the initialization procedure for the dual disk drive.

Referring now to FIG. 2, a preferred procedure is presented for initialization of the dual disk drive 10. In step 60 a user physically switches on power to the dual disk drive 10. Assuming the data connection between the dual disk drive 10 and the host 18 has been physically established, the user preferably activates all further initialization tasks from the host 18. In step 64, both the hard disk 42 and the processor 30 become fully functional. That is, the hard disk 42 is directed to spin-up (i.e., accelerate rotation of its included magnetic storage disk until the proper rotation rate is attained to allow data to be transferred) and the processor 30 is directed to boot-up. Depending on the dual disk drive 10 configuration, the microcode instructions for the processor 30 can reside in either a read only memory (ROM) associated with processor 30 or, alternatively, the microcode can reside on the hard disk 42. If the microcode resides in ROM, then the processor 30 can boot-up simultaneously with the hard disk 42 spin-up. Otherwise, processor 30 boot-up will occur immediately after spin-up and the microcode is downloaded into processor 30. Depending on the configurations of the host 18 and dual disk drive 10, this step may be executed either automatically after step 60 or as the result of a command issued to the dual disk drive 10 from the host 18. In step 68, the processor 30 requests the disk data transfer unit 38 to retrieve the SSD memory 58, or more generally the buffer memory 50, configuration parameter values from a manufacturer specified location on the hard disk 42. In the current embodiment, these parameters specify the size of the SSD memory 58 or the cache 54; plus, within the SSD memory 58: the sector size, the number of sectors per track, the number of tracks per cylinder and the number of cylinders. Once obtained, the processor 30 compares the values with microcode tables indicating legitimate combinations and ranges of parameter values. It should be noted that one such legitimate configuration is for the size of the SSD memory 58 to be zero. That is, the SSD portion of the dual disk drive 10 does not exist. In step 72, the processor 30 instructs the cache/SSD data transfer unit 46 to format the SSD memory 58 according to the new SSD memory configuration values. This includes determining the physical address range of the SSD memory 58 and then for each SSD sector: (i) locating the starting address of the sector, (ii) writing a sector header containing a sector identifier at the beginning of the sector, (iii) writing an error correction code at the end of the sector and (iv) initializing the data bytes between the header and error correction code to some predetermined bit sequence. Upon completion of the SSD memory 58 formatting, the cache/SSD data transfer unit 46 interrupts the processor 30 signaling that SSD memory 58 initialization is complete. In decision step 76, the processor 30 determines from diagnostic procedures executed on the components of the dual disk drive 10 whether or not data transfers between the dual disk drive 10 and the host 18 will function properly. If the diagnostics for the dual disk drive 10 indicate that it is not functioning properly, then in step 80, an error message is sent to the host 18 via the host interface 26. Conversely, if processor 30 determines that dual disk drive 10 is functioning properly, then in step 82, the processor 30 constructs a status message that is presented, via the host interface 26, to the host 18 indicating that the dual disk drive 10 is available for host 18 commands. In step 86, the user 14 either implicitly or explicitly, determines if the host 18 retains valid previous addressing information regarding the dual disk drive 10. Typically, such information is retained and thus nothing further need be done. However, if, for example, the dual disk drive 10 is newly connected to a host 18 data port, then the logical address ranges corresponding to the two disk devices must be conveyed to the host 18. This is accomplished in step 90 by the host 18 querying the dual disk drive 10 for (i) the maximum number of useable address locations, which is equivalently the maximum logical data address, and (ii) the logical address range of at least one of the disk devices. It should be noted that a significant advantage of the above procedure is that from a user 14 perspective this procedure is no different than the procedure to power up a commercially available single disk drive. For example, the user need not supply cache/SSD memory partition parameter values since default values are incorporated in to the buffer memory 50 configuration parameter values obtained from the hard disk 42. These default values have been set such that buffer memory 50 is preferably partitioned into 20-30% cache memory 54 and 70-80% SSD memory 58. From empirical examination it has been determined that for most hosts 18, these percentages are optimal.

Figure 3A:
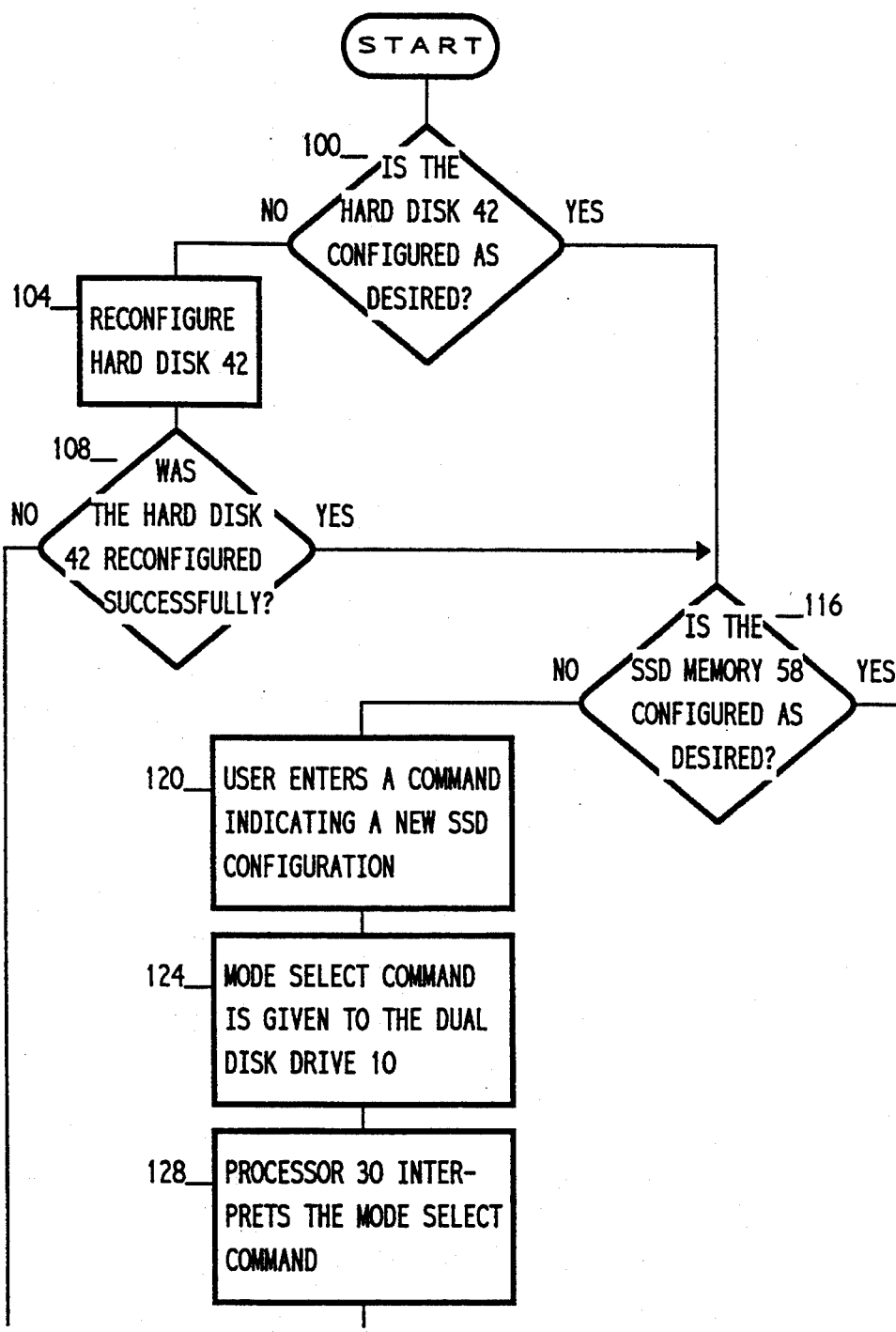
FIG. 3A-3C are a flowchart illustrating the reconfiguration procedure for the dual disk drive.
Figure 3B:
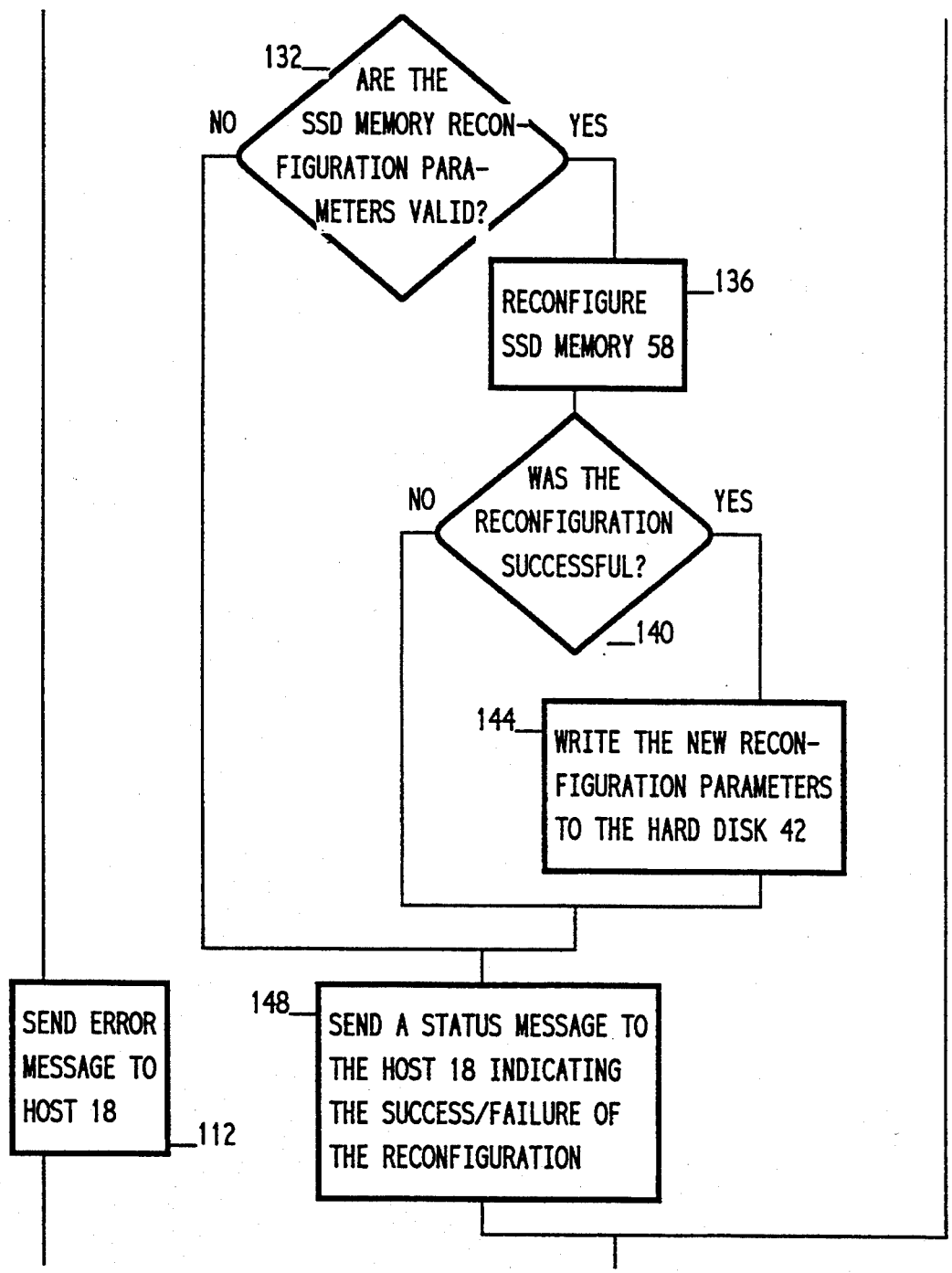
Figure 3C:
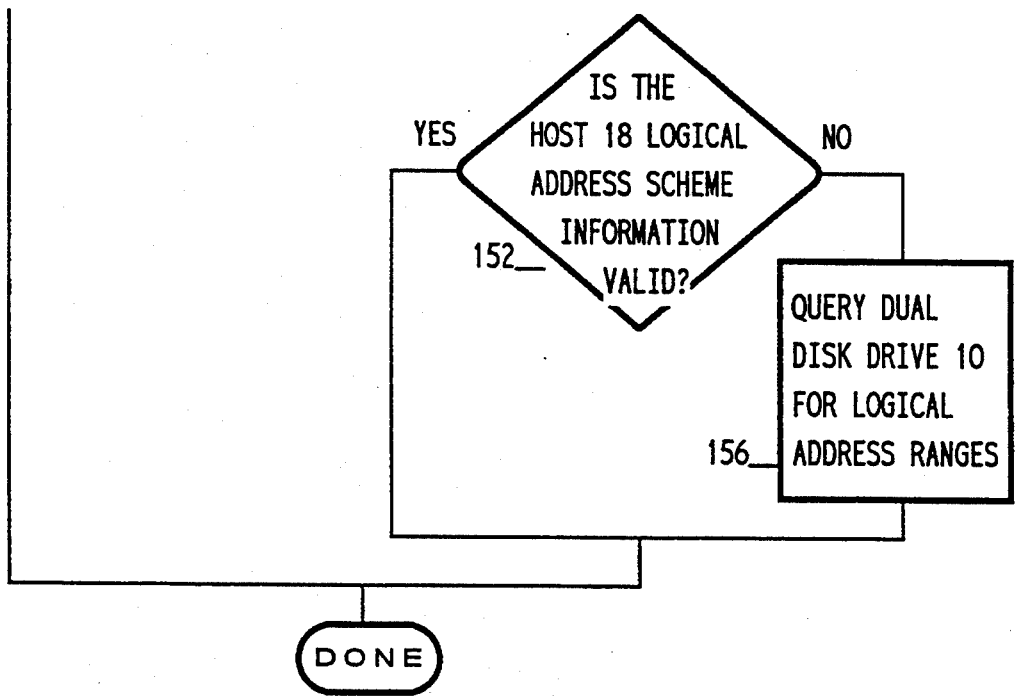

FIG. 3A-3C present a preferred procedure for reconfiguring the dual disk drive 10. In decision step 100 the user 14 makes a determination as to whether the hard disk 42 is configured as desired. If not then in step 104 the user 14 reconfigures the hard disk 42 using any one of a number of well known procedures. In step 108 the dual disk drive 10 executes diagnostics to determine whether or not the hard disk 42 was successfully configured. If not, then in step 112 the processor 30 constructs a status message to be presented to the host 18 indicating the failure of the reconfiguration command. If the hard disk 42 was successfully reconfigured, then decision step 116 is next encountered. In this step the user 14 makes a determination as to whether the SSD memory 58 is configured as desired. Note that in making this decision, or the decision in step 100, the user 14 can query the dual disk drive 10 for the current dual disk drive 10 configuration parameter values. In the preferred embodiment, a user query is translated into a SCSI "mode sense" command which, in turn, is presented to the dual disk drive 10. The mode sense command contains dual disk drive 10 specific labels indicating the parameter values desired. Moreover, these labels must be in predetermined positions in the command. If the user determines that the SSD memory 58 is configured as desired then nothing further needs to be done. If, however, SSD memory must be reconfigured, then in step 120 the user 14 inputs a host 18 command which is translated into an SCSI "mode select" command specifying a new SSD memory 58 configuration. There are two categories of parameters that can be specified in such reconfiguration commands: (i) those that specify the size of the SSD memory 58 partition and/or cache memory 54 partition and (ii) those that specify the disk organization of the SSD memory 58 into cylinders, tracks per cylinder, sectors per track and sector size. It should be noted that at least those parameters for configuring the size of the SSD memory 58 partition and/or cache memory 54 partition are unique to the dual disk drive 10 since this is neither permissible nor desirable with other disk devices. Thus, such dual disk drive 10 specific mode select parameters must be located in predetermined positions of the mode select command intended for device specific parameter values. In step 124, the mode select command is transferred to the host interface 26. In step 128, the host interface 26 interrupts the processor 30 with a signal indicating that a host command has been received. The processor 30 then interprets the command and determines that it is a SSD memory 58 reconfiguration command. In decision step 132, the processor 30 determines whether or not the reconfiguration parameter values are valid. That is, the processor 30 compares the values with microcode tables indicating legitimate combinations and ranges of parameter values. If the parameter values do not yield a valid SSD memory 58 configuration, then in step 148, a "bad SSD configuration" status message is generated. Note such a message is generated from various conditions. For example, since all data transfers between the hard disk 42 and the host 18 must go through the cache 54, the SSD memory 58 can not be so large that the cache 54 is less than the size of a data block. If the SSD configuration parameters constitute a valid combination, then in step 136, the SSD memory 58 is configured exactly as in step 72 of FIG. 2. That is, the processor 30: (i) determines the SSD memory 58 configuration values, (ii) supplies those values to the cache/SSD data transfer unit 46, and (iii) instructs the cache/SSD data transfer unit 46 to reformat the SSD memory 58. In decision step 140, the processor 30 executes diagnostic procedures, well known in the art, to determine if the reconfiguration of the SSD memory 58 was successful. If successful, then in step 144, the processor 30 transfers the new SSD memory 58 configuration parameter values directly to the disk data transfer unit 38 with instructions that these values are to overwrite the previous SSD memory 58 parameter values stored in the location on the hard disk 42 predetermined by the manufacturer. Regardless of which branch is taken from decision step 140, step 148 is again encountered causing the processor 30 to construct a status message to be presented to the host 18 indicating the success/failure of the SSD memory 58 reconfiguration command. In decision step 152, a determination is made by the user 14 if the host 18 now retains valid logical address range information regarding the dual disk drive 10. If the retained information is no longer valid, then, in step 156, as in step 86 of FIG. 2, the maximum logical data address of the dual disk drive 10 and the logical address range of at least one of the two disk devices in the dual disk drive 10 is conveyed to the host 18.

Figure 4A:
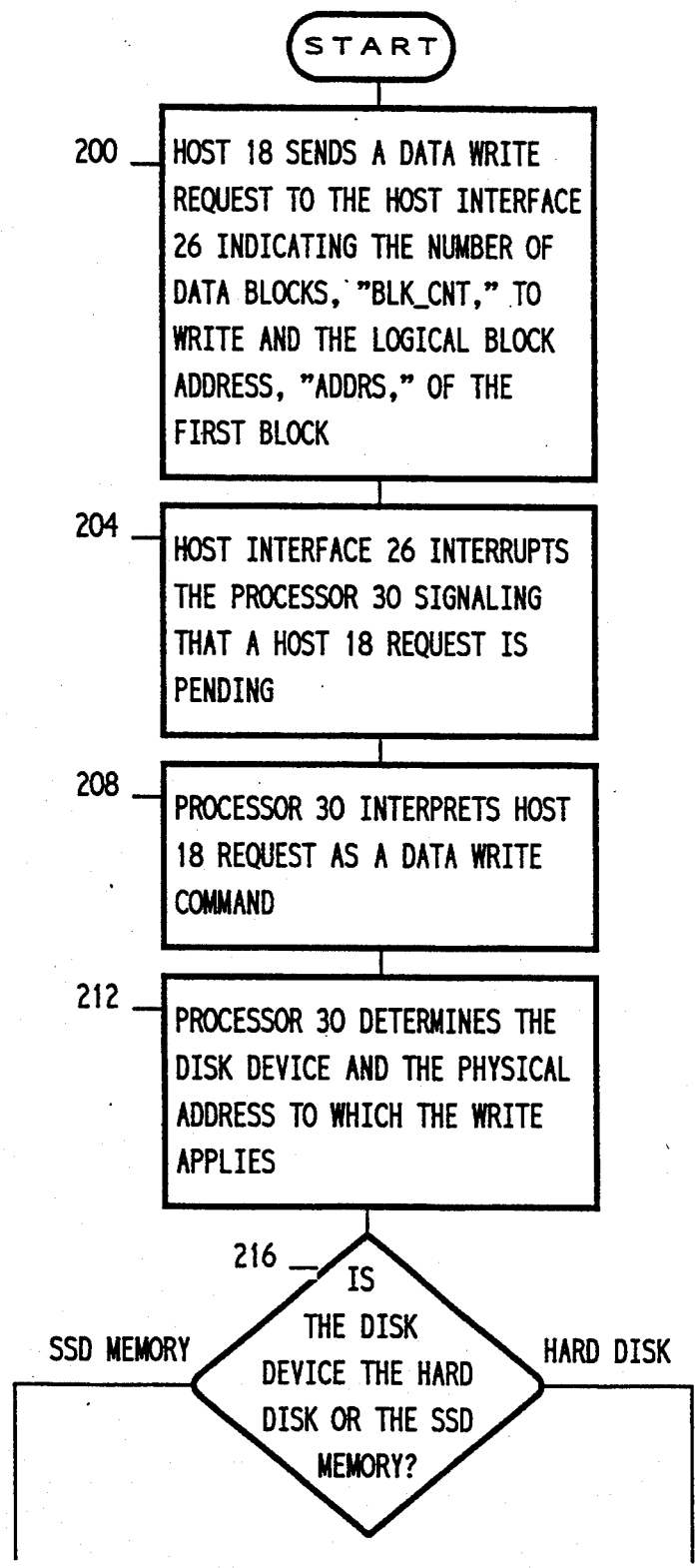
FIG. 4A-4C are a flowchart illustrating the procedure for writing to the dual disk drive.
Figure 4B:
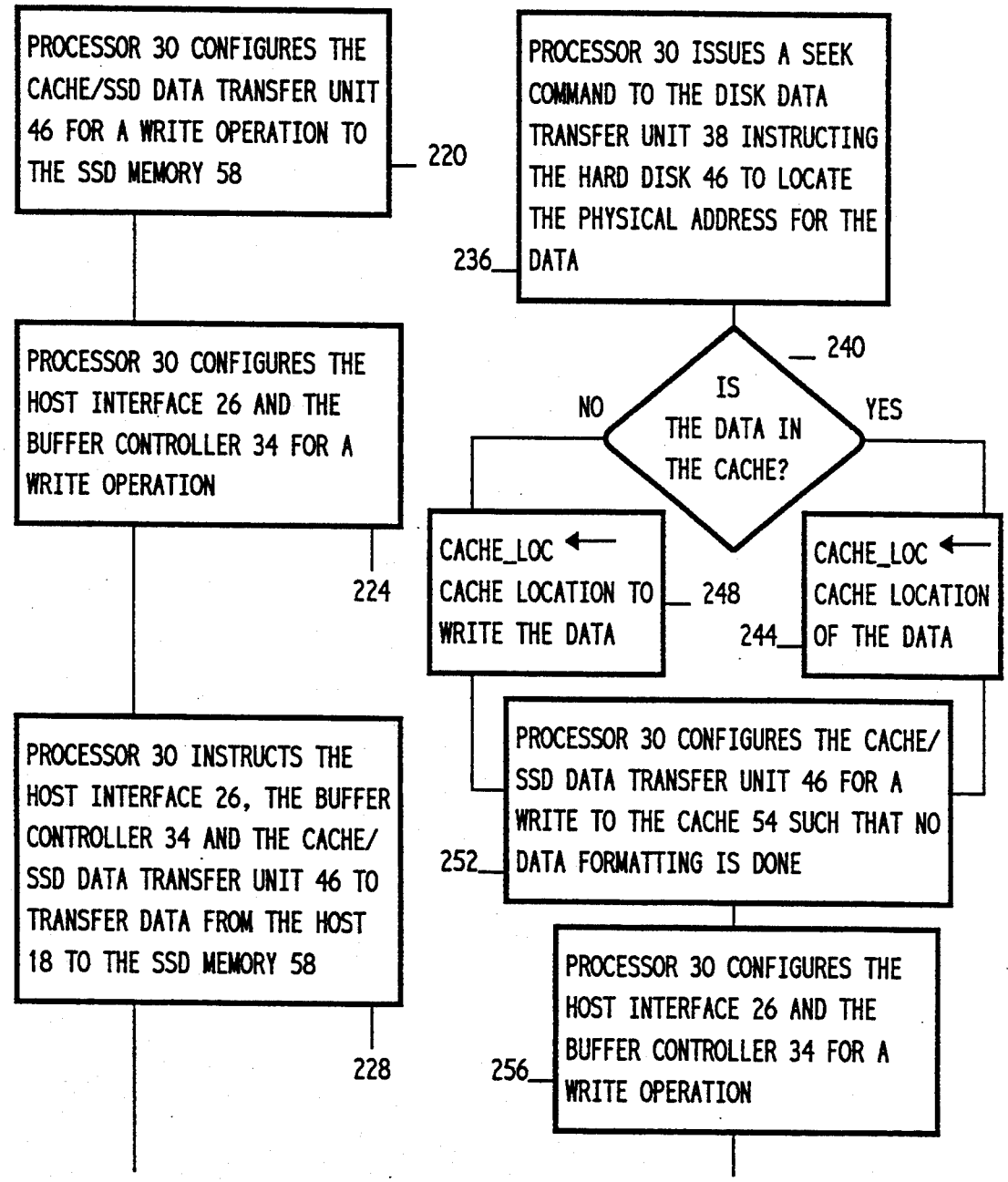
Figure 4C:
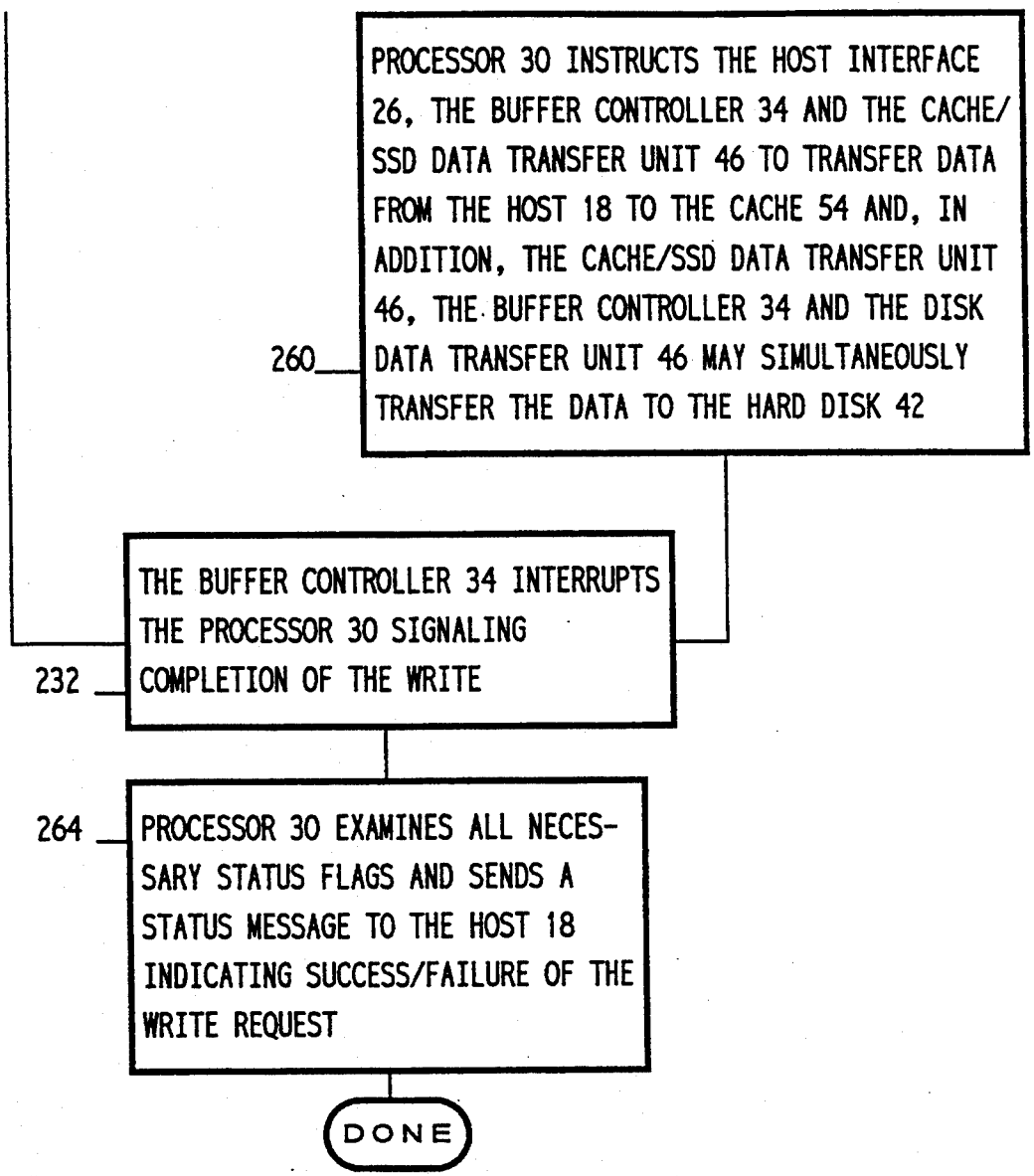

FIG. 4A–4C present a flowchart illustrating the steps involved in writing data to the dual disk drive 10. Referring to FIG. 4B, in step 200 the host 18 sends a data write request to the host interface 26 indicating the number of data blocks, "blk_cnt," to be transferred and the logical block address, "addrs," where the data blocks are to be written. In step 204 the host interface 26 interrupts the processor 30 signaling that a host 18 request is pending. In step 208 processor 30 interprets the host 18 request and determines that it is a data write request. In step 212, the processor 30 determines the disk device to which the write request applies. This is accomplished by comparing "addrs" with the logical address ranges associated with two disks. In addition, once the disk device is determined, the processor 30 translates the logical block address, "addrs," into a physical address. In decision step 216 the processor 30 determines which subsequent control flow branch to execute depending on whether the determined disk device is the hard disk 42 or the SSD memory 58. Referring to FIG. 4A, if the SSD memory 58 is the disk device to which the host 18 write request is directed, then step 220 is next executed. In this step the processor 30 configures the cache/SSD data transfer unit 46 in preparation for a write to the SSD memory 58. Configuring the cache/SSD data transfer unit 46 includes providing the unit with: (i) the number of blocks to be written, "blk_cnt," (ii) the initial header location address in the SSD memory 58 where the data is to be written as determined from the physical address established in step 212 above, (iii) the expected value of the sector header at this location and (iv) a signal indicating that the data to be received from the buffer controller 34 is to be formatted into the disk-like format required for the SSD memory 58. It should be noted that the processor 30 functionality required to supply (i) through (iii) is the same functionality required for initializing the disk data transfer unit 38 for a hard disk 42 data transfer. Thus, in this context, much of the functionality inherent in a conventional hard disk drive can be taken advantage of to facilitate the conversion of a conventional hard disk drive to a dual disk drive 10. In step 224, the processor 30 configures the host interface 26 and the buffer controller 34 to transfer "blk_cnt" number of data blocks from the host 18 to the cache/SSD data transfer unit 46. Configurations of this sort are well known in the art. In the case of the buffer controller 34 this includes initializing a "transfer buffer" and transfer buffer parameter values within the buffer controller 34 such that the buffer controller 34 can reconcile differences in data transfer rates between the data sources so that faster data sources do not needlessly wait for slower data sources. In step 228, the processor 30 instructs the host interface 26, the buffer controller 34 and the cache/SSD data transfer unit 46 to transfer the data from the host 18 to the SSD memory 58. It should be noted that unless an error condition arises the processor 30 is not involved in the data transfer beyond commencing the transfer. The data is input from the host 18 into a host interface 26 queue where it is retrieved by the buffer controller 34 and placed in a transfer buffer as discussed above. The buffer controller 34 attempts to keep the transfer buffer at least partially full during the data transfer. If the amount of data in the transfer buffer falls below a predetermined level (and there is more data to be transferred), then the buffer controller 34 halts data transfer to the target data transfer component, i.e., the cache/SSD data transfer unit 46 in this case, and requests the next data items from the source data transfer component, i.e., the host interface 26 in this case. If the amount of data in the transfer buffer rises above a predetermined level then the buffer controller 34 halts data transfer to the transfer buffer from the source data transfer component and requests the target data transfer component to read the next data items from the transfer buffer. As the data is transferred to the cache/SSD data transfer unit 46, it is written into the data portion of those sectors predetermined by the processor 30. Prior to any data block being written, the cache/SSD data transfer unit 46 uses the SSD memory 58 sector header location obtained in step 220 to retrieve the first sector header. This header is compared against the expected header, also obtained in step 220. If the two headers are identical, then the first data block to be written is transferred from the buffer controller 34 into the data portion of the sector and error correction bits are written at the end of the sector to correct any future data transmission errors as is well known in the art. Subsequently, the cache/SSD data transfer unit 46 iteratively executes the following instructions until all further data blocks have been written: (i) the header location address is incremented by the sector size to address the header location of the next sector, (ii) the header at this new location is retrieved, (iii) the expected header value is incremented to reflect what presumably should be the value of the newly retrieved header, (iv) the retrieved header is compared against the expected header and if they are identical then the next data block is transferred from the buffer controller 34 to the data portion of this new sector, and finally (v) the error correction bits are written at the end of this sector. If none of the three participating data transfer components (i.e. the host interface 26, the buffer controller 34 and the cache/SSD data transfer unit 46) interrupt the processor 30 with an error status during the data transfer, then in step 232, the buffer controller 34 interrupts the processor 30 signaling completion of the write. Referring now to the alternate decision branch after step 216 where the hard disk 42 is the disk device to which the data is to be written, step 236 is encountered. In this step the processor 30 issues a seek instruction to the disk data transfer unit 38 to instruct the hard disk 42 to position its data transfer head at the physical address corresponding to "addrs." While the seek instruction is being executed, the processor 30 proceeds to decision step 240 to determine whether or not a previous version of the data to be written is currently in the cache 54. If so, then in step 244 the processor assigns the address of the location of the data to the variable "cache_loc." If the data is not in the cache 54, then in step 248 the processor 30 determines a cache location where the data can be written and assigns the address of this location to "cache_loc." Note that there are many well known caching strategies that can be used here to determine this location. Regardless of the decision branch taken from step 240, step 252 is encountered after "cache_loc" has been assigned. In this step the processor 30 configures the cache/SSD data transfer unit 46 to write, without modification or formatting, the data blocks to be transferred from the buffer controller 34 to the cache 54. In step 256, the processor 30 configures the host interface 26 and the buffer controller 34 to write "blk_cnt" number of data blocks to the cache/SSD data transfer unit 46. Referring to FIG. 4C, in step 260, the processor 30 instructs the host interface 26, the buffer controller 34 and the cache/SSD data transfer unit 46 to transfer the data blocks from the host 18 to the cache 54. In addition, depending on the caching strategy, these same data blocks may be written to the disk data transfer unit 38 in route to the hard disk 42. If the caching strategy allows data to reside in the cache 54 during the execution of other host 18 data transfer requests without being written to the hard disk 42 (i.e. "write back" caching), then the buffer controller 34 need only be configured and instructed to transfer data to the cache/SSD data transfer unit 46. On the other hand, if the caching strategy requires all data written to the cache 54 to be written to the hard disk 42 prior to the execution of any further host 18 data transfer requests (i.e. "write through" caching), then preferably after a predetermined number of data bytes have been transferred to the cache/SSD data transfer unit 46 in route to the cache 54, the buffer controller 34 and the cache/SSD data transfer unit 46 will commence multiplexing the data transfer into the cache 54 with an additional data transfer of this same data to the hard disk 42 via disk data transfer unit 38. If the processor 30 is not interrupted with an error status during the data transfer in step 260, then step 232 is once again encountered and the buffer controller 34 will interrupt the processor 30 signaling completion of the write. Finally, in step 264, the processor 30 examines a sufficient number of status flags from the participating data transfer components to determine whether the write was successful or not. The processor 30 then sends a status message to the host 18, via the host interface 26, indicating the success/failure of the write request. It should, however, be noted that step 264 will also be executed whenever the processor 30 receives a data transfer error interrupt that can not be rectified.

Figure 5A:
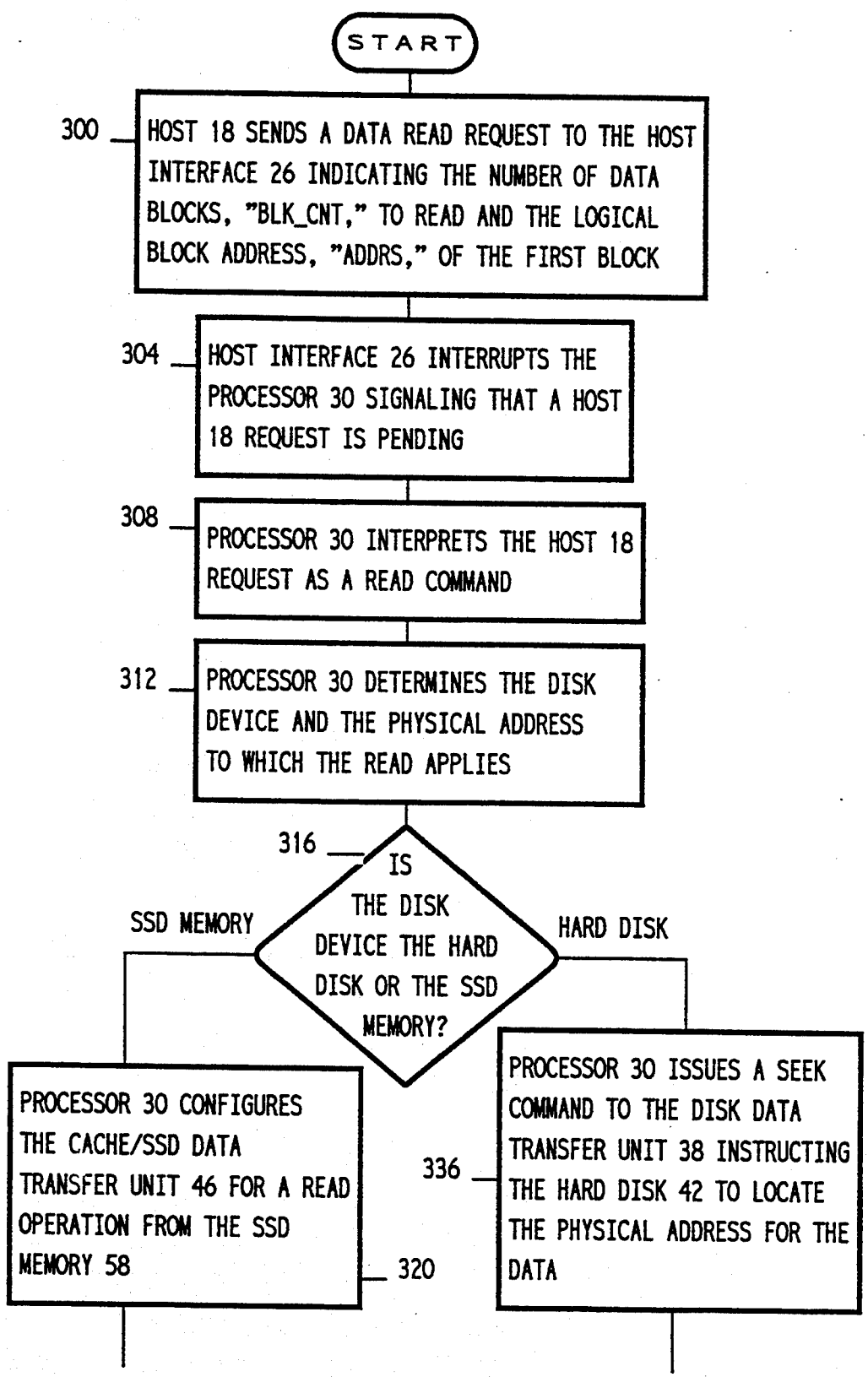
FIG. 5A-5C are a flowchart illustrating the procedure for reading from the dual disk drive.
Figure 5B:
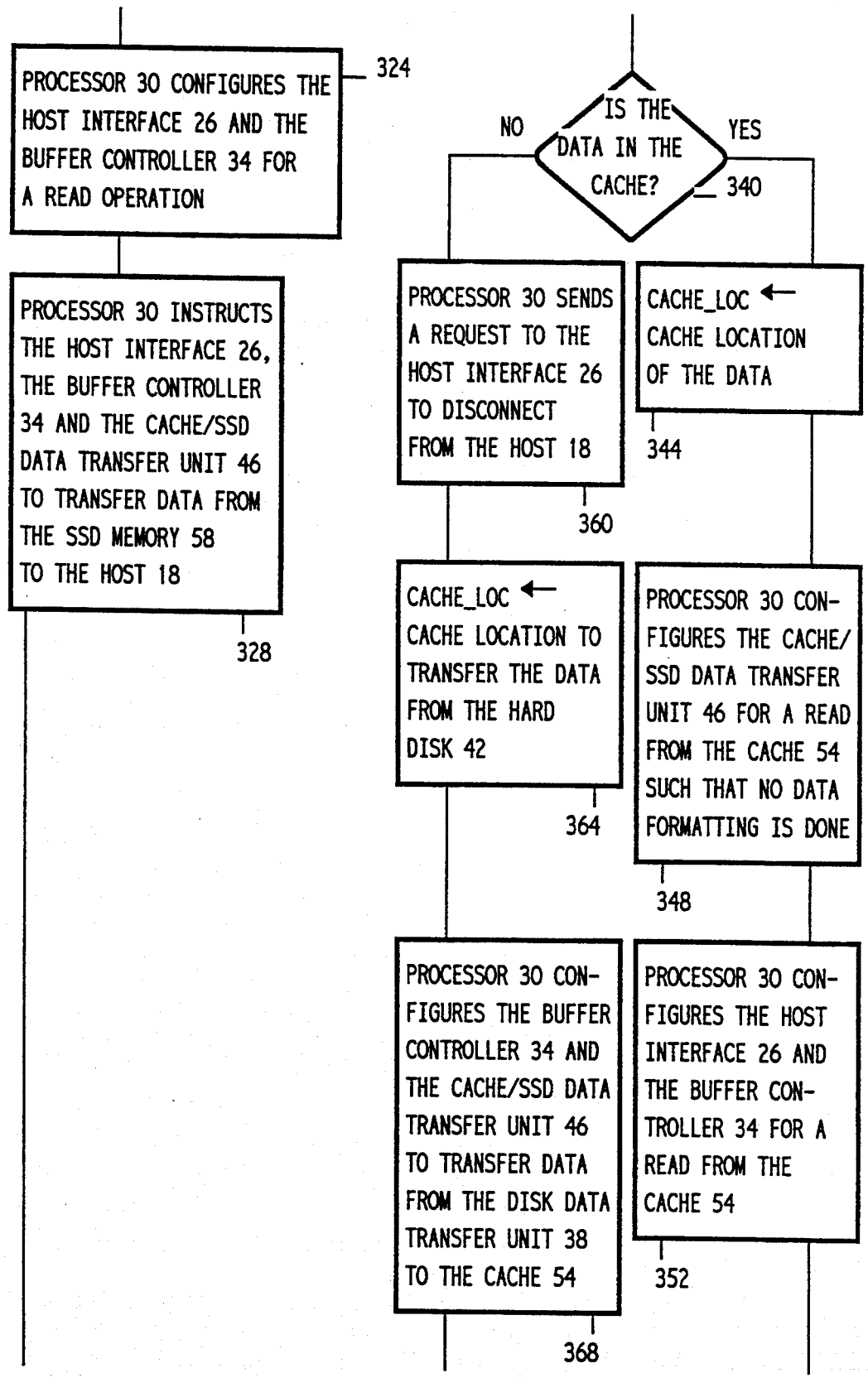
Figure 5C:
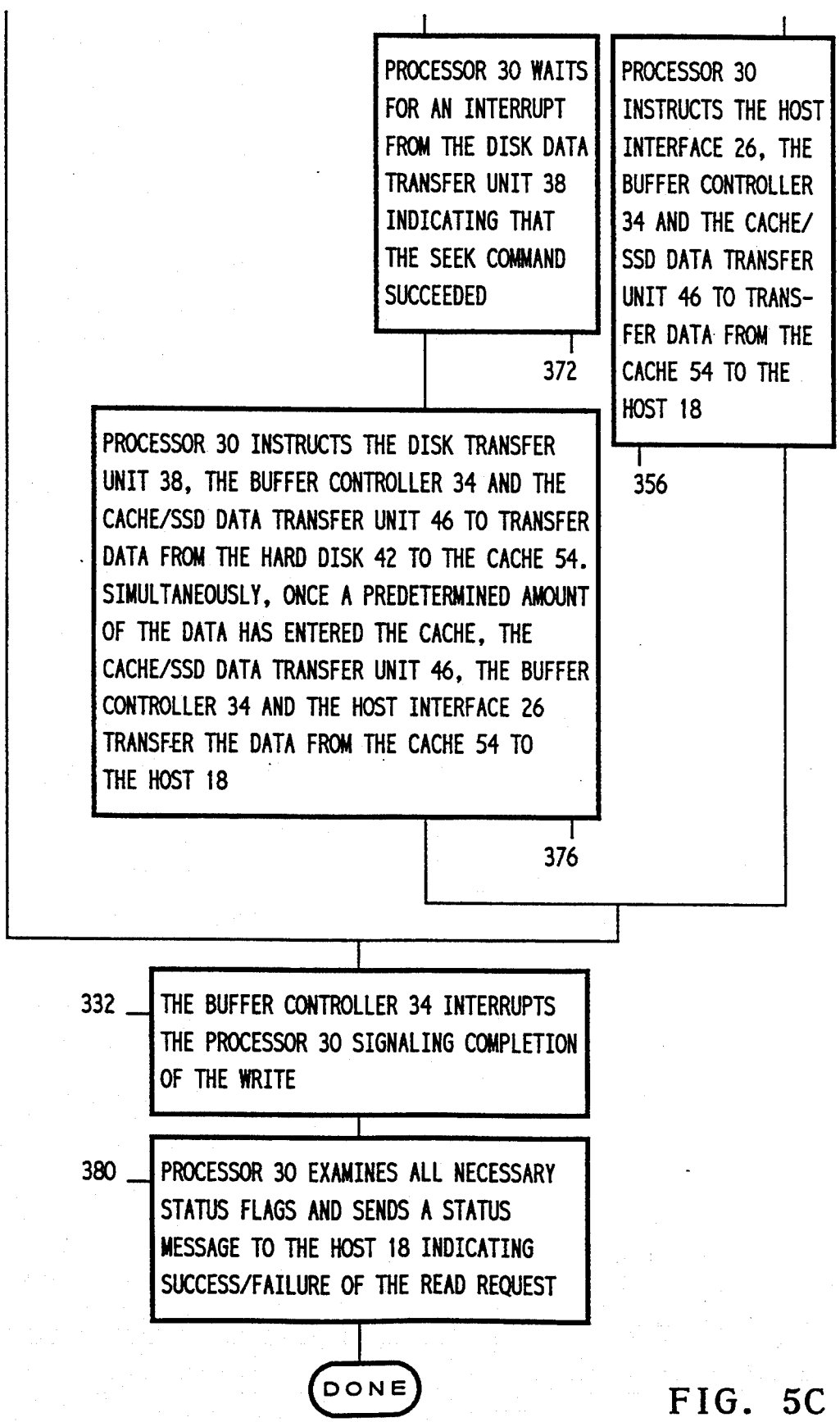

FIG. 5A–5C present a flowchart illustrating the steps involved in reading data from the dual disk drive 10. Referring to FIG. 5A, in step 300 the host 18 sends a data read request to the host interface 26 indicating the number of data blocks, "blk_cnt," to be transferred and the logical block address, "addrs" from which the data blocks are to be read. In step 304 the host interface 26 interrupts the processor 30 signaling that a host 18 request is pending. In step 308 processor 30 interprets the host 18 request and determines that the request is a data read request. In step 312, the processor 30 determines the disk device to which the read request applies. This is, of course, accomplished exactly as in step 212 of FIG. 4. In addition, once the disk device is determined, the processor 30 translates the logical block address, "addrs," into a physical address In decision step 316, the processor 30 determines which subsequent control flow branch to execute depending on whether the determined disk device is the hard disk 42 or the SSD memory 58. If the SSD memory 58 is the disk device to which the host read request is directed, then step 320 is next executed. In this step the processor 30 configures the cache/SSD data transfer unit 46 in preparation to read from the SSD memory 58. The configuring is similar to step 220 in FIG. 4 in that it includes providing the cache/SSD data transfer unit 46 with: (i) the number of blocks to be read, "blk_cnt," (ii) the initial header location address, in the SSD memory 58 where the data is to be read as determined from the physical address established in step 312 above, (iii) the expected value of the sector header at this location and (iv) a signal indicating that the data to be received from the SSD memory 58 is to be transferred to the host 18 without header and error correction bits. Referring to FIG. 5B, in step 324 the processor 30 configures the host interface 26 and the buffer controller 34 to transfer "blk_" number of data blocks from the cache/SSD data transfer unit 46 to the host 18. In step 328, the processor 30 instructs the host interface 26, the buffer controller 34 and the cache/SSD data transfer unit 46 to transfer data from the SSD memory 58 to the host 18. The requested data is transferred from the SSD memory 58 through the cache/SSD data transfer unit 46 a sector at a time. Each sector transferred has its sector header compared to an expected header as in step 228 of FIG. 4. If the sector header and the expected header are identical and there are no errors requiring the sector error correction code bits then the data portion of the sector is transferred to the buffer controller 34. Once the buffer controller 34 begins receiving data blocks from the cache/SSD data transfer unit 46, the buffer controller 34 attempts to keep its transfer buffer at least partially full during the data transfer in a manner similar to that discussed in step 228 of FIG. 2. If none of the three participating data transfer components (i.e. the host interface 26, the buffer controller 34 and the cache/SSD data transfer unit 46) interrupt the processor 30 with an error status during the data transfer, then in step 332, the buffer controller 34 will interrupt the processor 30 signaling completion of the read. Referring now to the alternate decision branch after step 316 where the hard disk 42 is determined to be the device from which the data is to be read, step 336 is encountered. In this step, the processor 30 issues a seek instruction to the disk data transfer unit 38 instructing the hard disk 42 to position its data transfer head at the physical address corresponding to "addrs." While the seek instruction is being executed, the processor 30 proceeds to decision step 340. In this step the processor 30 determines whether or not a current version of the data to be read is in the cache 54. If so, then in step 344, the processor assigns the address of the data cache location to the variable, "cache_loc." In step 348, the processor 30 configures the cache/SSD data transfer unit 46 to read "blk_cnt" data blocks from the cache 54 and transfer them to the buffer controller 34 without any modification or formatting. In step 352, the processor 30 configures the host interface 26 and the buffer controller 34 to transfer "blk_cnt" number of data blocks from the cache/SSD data transfer unit 46 to the host 18. Referring to FIG. 5C, in step 356, the processor 30 instructs the host interface 26, the buffer controller 34 and the cache/SSD data transfer unit 46 to transfer the data blocks from the cache 54 to the host 18. Returning now to decision step 340, if the data to be read does not reside in the cache 54, then step 360 is executed. In this step, since the data to be read is not immediately available, the processor 30 sends a request to the host interface 26 to disconnect from the host 18. Thus, the host 18 may use the bus assigned to the dual disk drive 10 for other purposes. In step 364, the processor 30 determines a cache location where the data can be written from the hard disk 42 and assigns the address of this location to "cache_loc." In step 368, the processor 30 configures the buffer controller 34 and the cache/SSD data transfer unit 46 to transfer "blk_cnt" number of data blocks from the disk data transfer unit 38 to the cache 54. Note, in this step, the cache/SSD data transfer unit 46 is configured to write the data to the cache 54 without any modification or formatting. In step 372, the processor 30 waits for an interrupt from the disk data transfer unit 38 indicating the seek command has completed and successfully located the data to be read. In step 376, the processor instructs the disk transfer unit 38, the buffer controller 34 and the cache/SSD data transfer unit 42 to transfer the data located on the hard disk 42 to the cache 54. Preferably after a predetermined number of data bytes have been transferred to the cache 54, the host interface 26, the buffer controller 34 and the cache/SSD data transfer unit 46 will commence multiplexing the data transfer to the cache 54 with an additional data transfer of this same data from the cache 54 to the host 18. Regardless of whether the hard disk 42 data to be read was initially in the cache 54 or not, if the processor 30 is not interrupted with an error status during either of the data transfer steps 356 or 376, then step 332 is once again encountered where the buffer controller 34 interrupts the processor 30 signaling completion of the read. Finally, in step 380, the processor 30 examines a sufficient number of status flags from the participating data transfer components to determine whether the read was successful or not. The processor 30 then sends a status message to the host 18 via the host interface 26 indicating the success/failure of the read request. It should be noted, however, that step 380 will also be executed at any time during the read procedure where the processor 30 receives a data transfer error interrupt that can not be rectified.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable other skilled in the art to utilized the invention is such, or other embodiments, and with the various modifications required by their particular application or uses of the invention. It is intended that the appended claims be construed to include alternative embodiments to the extent permitted by the prior art.

What is claimed is:

1. A method for transferring data between a host unit and a data storage system, comprising:
 partitioning a memory into at least:
  (A1) a cache memory for storing data using a first data format; and
  (A2) a second memory partition for storing data using a second data format;
 wherein said cache memory provides a data cache for a storage device, the host unit having different address spaces for said second memory partition and said storage device;
 determining when data is to be transferred by:

(B1) a first da transfer between the host unit and said storage device by way of said cache memory; and (B2) a second transfer between the host unit and said second memory partition;

performing the first data transfer and the second data transfer as determined in said step of determining;

wherein a same buffer controller for buffering data is used:

(C1) between the host unit and said second memory partition for the second data transfer;

(C2) between the host unit and said cache memory for the first data transfer; and (C3) between said storage device and said cache memory for the first data transfer.

2. A method as claimed in claim 1, wherein said step of partitioning includes one of inputting and defaulting to information relating to size of at least one of said cache memory and said solid state disk memory.

3. A method as claimed in claim 1, wherein said step of partitioning includes executing a command for formatting said solid state disk memory into tracks and sectors.

4. A method as claimed in claim 1, wherein said step of partitioning includes executing instructions that include at least one of the following:

a configuration instruction with a predetermined parameter field whose value is used to specify size of at least one of said cache memory and said solid state disk memory;

a mode sense instruction with a predetermined parameter field whose value is used to request the size of at least one of said cache memory and said solid state disk memory.

5. A method as claimed in claim 1, wherein said step of partitioning includes storing, in a processor memory host unit address information wherein said address information allows for memory locations of said second memory partition to be distinguishable by the host unit from any other memory locations in said memory and said storage device.

6. A method as claimed in claim 1, wherein said step of determining includes:

associating a logical data address with data from the host unit; and deciding which one of said storage device and said second memory partition has an address corresponding to said logical data address.

7. A method as claimed in claim 6, wherein said step of deciding includes:

storing, in a processor memory, memory information for distinguishing between addresses associated with said second memory partition and addresses associated with said storage device, said processor memory included in a processor means for controlling data transfers with the host unit.

8. A method, as claimed in claim 7, wherein said step of deciding includes:

using said logical data address for comparing with said memory information.

9. A method as claimed in claim 6, wherein said step of deciding includes one of the following:

determining an addressable memory location in said second memory partition when said logical data address refers to a storage location of said second memory partition and determining an addressable memory location in each of said cache memory and said storage device when said logical data address refers to a storage location of said storage device.

10. A method, as claimed in claim 1, wherein:
said second data format is a disk data format.

11. A method, as claimed in claim 1, wherein:
said first and second data formats are different.

12. A method, as claimed in claim 1, wherein:
said step of performing the second data transfer includes translating data between a host data format used by the host unit and said second data format.

13. A method, as claimed in claim 12, wherein:
said step of translating includes adding disk sector header information when writing data to said second memory partition and removing the sector header information when reading data from said second memory partition.

14. A method, as claimed in claim 12, wherein:
said step of performing second data transfer includes providing data transfer control information to a transfer unit means, said transfer unit means for transferring data between said buffer controller and said memory, wherein said transfer unit means uses said control information for determining whether to translate between the host data format and said second data format when data is transferred between said buffer controller and said memory.

15. A method, as claimed in claim 14, wherein:
said steps of partitioning, determining and performing are accomplished using the following components:
(a) a conventional disk controller having said memory and said buffer controller, and (b) said transfer unit means.

16. A method, as claimed in claim 1, wherein:
said buffer controller and said memory are included in a conventional disk controller.

17. A method, as claimed in claim 1, wherein:
said buffer controller is used for reconciling differences in data transfer rates between the host unit, said second memory partition, said cache memory and said data storage means as defined in (C1), (C2) and (C3).

18. An apparatus for storing and providing data to a host unit, comprising:

memory means having addressable storage locations at which data is stored, said memory means being partitioned to include cache memory and solid state disk memory having data encoded, respectively, in a first data format and a different second data format, said second data format being a disk format;

data storage means for storing data, the data stored on said data storage means being encoded in a third data format, the host unit having different address spaces for said data storage means and said solid state disk memory;

first data transfer means for translating data between said third data format and a fourth data format during a transfer of data between said data storage means and the host unit;

second data transfer means for translating data between the fourth data format and the second data format during a transfer of data between the host unit and said solid state memory;

controller means for controlling the following data transfers:

(A1) between the host unit and said solid state memory means;

(A2) between the hot unit and said cache memory; and
(A3) between said data storage means and said cache memory.

19. An apparatus as claimed in claim 18, wherein said controller means includes:
means for inputting partitioning information used to partition said memory means.

20. An apparatus as claimed in claim 18, wherein said controller means receives, from at least said host unit, formatting commands for formatting said solid state disk memory into tracks and sectors and means for executing the formatting commands.

21. An apparatus as claimed in claim 18, wherein said controller means includes for storing memory means mapping information, said memory means mapping information for determining an addressable storage location in said one of said cache memory and said solid state disk memory.

22. An apparatus as claimed in claim 18, wherein said controller means includes:
first means for controlling the transfer of data between the host unit and said cache memory and between said cache memory and said data storage means;
second means for controlling the transfer of data between the host unit and said solid state disk memory.

23. An apparatus as claimed in claim 22, wherein said first means for controlling includes:
host interface means for transferring data and data storage commands related to said host unit; and
processor means for processing data storage commands from said host unit, said processor means for determining addressable storage locations in said cache memory and said data storage means.

24. An apparatus as claimed in claim 22, wherein said second means for controlling includes:
host interface means for receiving and sending data to the host unit; and
processor means for processing data storage commands from said host unit, said processor means for determining addressable storage locations in said solid state disk memory.

25. An apparatus as claimed in claim 22, wherein said first means includes at least portions of said second means.

26. An apparatus as claimed in claim 18, wherein said controller means includes a processor means for use in comparing a logical address of said host unit with logical address information associated with said data storage means and said solid state memory.

27. An apparatus as claimed in claim 18, wherein said second data transfer means is used for coupling data between said controller means and said memory means.

28. An apparatus as claimed in claim 27, wherein one of said controller means and said second data transfer means includes means for determining whether data is to be transferred to said cache memory or said solid state disk memory.

29. An apparatus as claimed in claim 27, wherein said controller means includes means for providing said second data transfer means with format determining information for formatting data into said second data format when said data is being sent to said solid state disk memory and for not formatting said data when said data is being sent to said cache memory.

30. An apparatus as claimed in claim 29, wherein said second data transfer means includes means for removing said format information from said data when receiving said data from said solid state disk memory.

31. An apparatus as claimed in claim 29, wherein said format information includes header bits and error correction bits.

32. An apparatus, as claimed in claim 18, wherein:
said controller means is used for partitioning said memory means into at least said cache memory and said solid state disk memory.

33. An apparatus, as claimed in claim 18, wherein:
said controller means includes a same buffer controller for buffering the following data transfers: (A1), (A2) and (A3), said buffer controller included in a conventional disk controller.

34. An apparatus, as claimed in claim 33, wherein:
said second transfer means includes a transfer unit for translating between the fourth data format and the second data format when data is transferred between said buffer controller and said solid state disk memory.

35. An apparatus, as claimed in claim 18, wherein:
same data stored in said solid state disk memory is stored in said data storage means only when a fault occurs in the apparatus.

36. An apparatus for storing and providing data to a host unit comprising:
conventional data storage drive means for storing data, said conventional data storage drive means including:
(A1) data storage means for storing data;
(A2) caching memory for caching data during data transfers between the host unit and said data storage means;
(A3) buffer controller means for buffering data (a) between said caching memory and the host unit; and (b) between said caching memory and said data storage means;
partitioning means for partitioning data storage locations in said caching memory into:
(B1) a first memory partition of data storage locations used for caching data transfers between the host unit and said data storage means;
(B2) a second memory partition of said data storage locations used for storing data in a disk format;
wherein data storage locations in said data storage means have addresses that are distinguishable by the host unit from addresses of data storage locations in said second memory partition;
transfer unit means for transferring data:
(C1) between said buffer controller means and said first memory partition substantially without altering data being transferred;
(C2) between said buffer controller means and said second memory partition wherein data is translated into said disk format when transferred to said data storage locations of said second memory partition, and, data is translated into a data format readable by the host unit when transferred to said buffer controller means.

* * * * *